US008495184B2

(12) United States Patent
Doccttel et al.

(10) Patent No.: US 8,495,184 B2
(45) Date of Patent: Jul. 23, 2013

(54) RESOLUTION OF CONFLICTING NETWORK SETTINGS ON A SOFTWARE PARTITION SERVER

(75) Inventors: Yolimar Doccttel, Leander, TX (US); Eric P. Fried, Austin, TX (US); Kendell D. Zahn, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1022 days.

(21) Appl. No.: 11/751,366

(22) Filed: May 21, 2007

(65) Prior Publication Data
US 2008/0294756 A1    Nov. 27, 2008

(51) Int. Cl.
*G06F 15/177* (2006.01)

(52) U.S. Cl.
USPC .......................................... 709/221

(58) Field of Classification Search
USPC .......................................... 709/221
See application file for complete search history.

(56) References Cited

U.S. PATENT DOCUMENTS

| 6,366,958 | B1* | 4/2002 | Ainsworth et al. | 709/230 |
|---|---|---|---|---|
| 7,356,679 | B1* | 4/2008 | Le et al. | 713/1 |
| 2002/0186676 | A1* | 12/2002 | Milley et al. | 370/341 |
| 2005/0108407 | A1* | 5/2005 | Johnson et al. | 709/228 |
| 2006/0031385 | A1* | 2/2006 | Westerdal | 709/217 |
| 2006/0206300 | A1* | 9/2006 | Garg et al. | 703/27 |
| 2007/0214350 | A1* | 9/2007 | Isaacson | 713/2 |

* cited by examiner

*Primary Examiner* — William Goodchild
(74) *Attorney, Agent, or Firm* — Matthew W. Baca

(57) ABSTRACT

A method, system and computer-readable medium for resolving conflicting network settings on a software partition server. In one embodiment, the method clones a software partition of a data processing system to obtain a second software partition. The method detects a conflict between a network configuration of the second software partition and an existing network configuration of an existing software partition on the data processing system. The method then dynamically resolves the conflict between the network configuration of the second software partition and the existing network configuration of the existing software partition without additional input from the user.

4 Claims, 3 Drawing Sheets

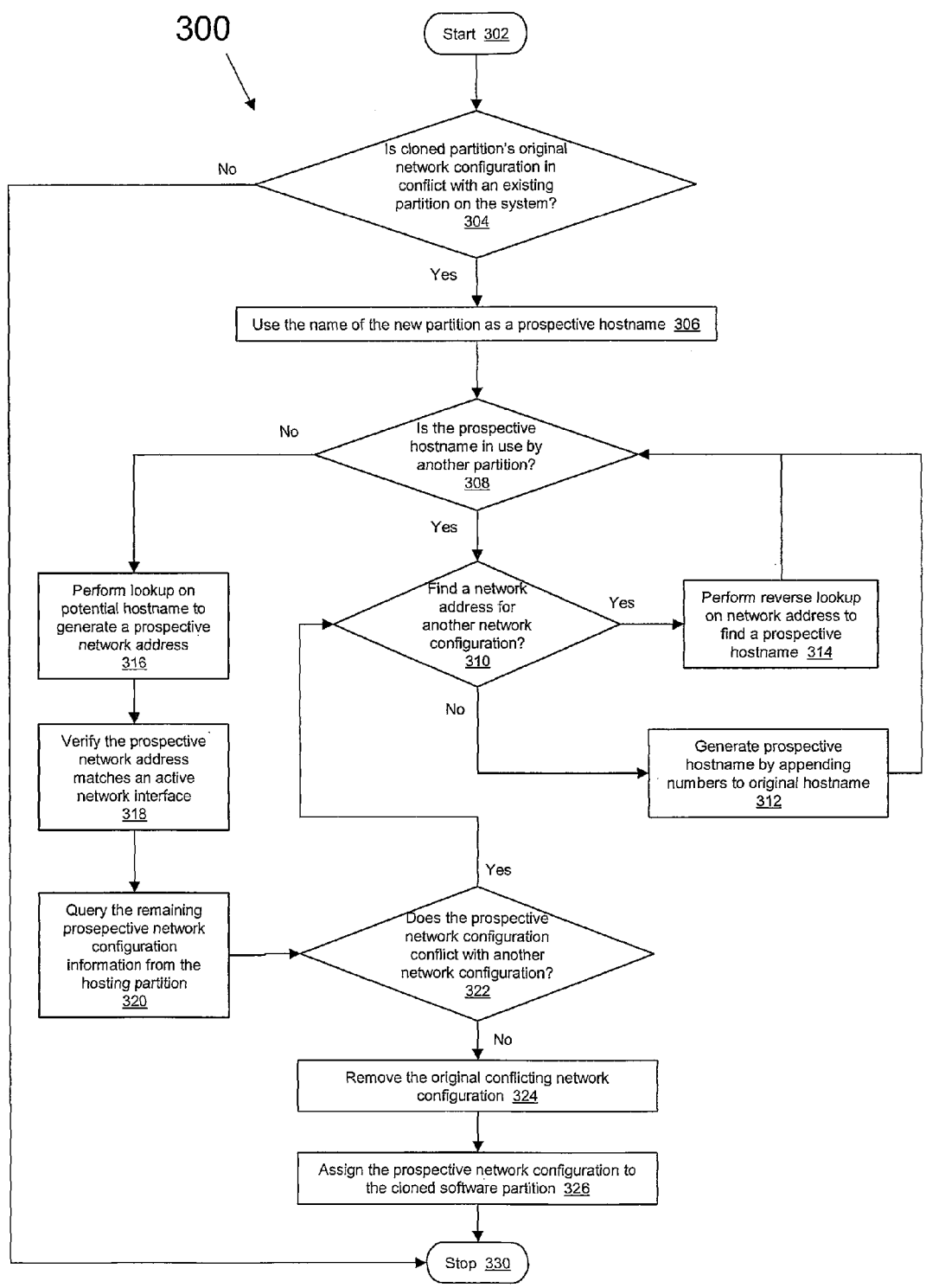

RESOLUTION OF CONFLICTING NETWORK SETTINGS ON A SOFTWARE PARTITION SERVER

BACKGROUND OF THE INVENTION

1. Field of the Invention

The present invention relates in general to the field of computers and similar technologies, and in particular to resolving conflicting network settings on a software partition server.

2. Description of the Related Art

The process of cloning software partitions involves taking configuration settings from an existing partition and reusing the configuration settings to create a new "cloned" partition. However, some of the settings from the original partition, such as its name, network settings and installation directory cannot be reused by the cloned partition. An alternate partition name and installation directory can be easily generated by using any number of random name generation methods. However, current solutions to resolving network settings are more involved and normally require human intervention. The task of determining available network resources and verifying that the resources are not already used by other existing software partitions on the system can be tedious, particularly for systems hosting large number of software partitions.

There is a need in the art for a mechanism that allows the software partition cloning process to dynamically resolve network configuration settings without human intervention.

SUMMARY OF THE INVENTION

The present invention provides a method, system and computer-readable medium for resolving conflicting network settings on a software partition server. In one embodiment, a software partition cloning program clones a software partition of a data processing system to obtain a second software partition. The program detects a conflict between a network configuration of the second software partition and an existing network configuration of an existing software partition on the data processing system. The program then dynamically resolves the conflict between the network configuration of the second software partition and the existing network configuration of the existing software partition without additional input from the user.

The above, as well as additional purposes, features, and advantages of the present invention will become apparent in the following detailed written description.

BRIEF DESCRIPTION OF THE SEVERAL VIEWS OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 3 is a flowchart that depicts an exemplary method for resolving conflicting network configurations in accordance with a preferred embodiment of the present invention.

DETAILED DESCRIPTION OF THE INVENTION

A preferred embodiment of the present invention is directed to a cloned software partition in a data processing system, and associated methods for generating a network configuration for a cloned software partition. In accordance with an embodiment of the present invention, the software partition cloning program would be able to dynamically resolve network configuration conflicts without intervention by a user of the data processing system. The program creates new settings for a network configuration of a cloned software partition by using values of other network configurations of the cloned software partition, detecting unused network resources, and/or generating values randomly. The present invention can take the form of an entirely hardware embodiment, an entirely software embodiment or an embodiment containing both hardware and software elements. In the described embodiment, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus or device.

The medium can be an electronic, magnetic, optical, electromagnetic, infrared or semiconductor system, apparatus or device or a propagation medium. Examples of a computer-readable medium include a semiconductor or solid state memory (e.g., flash drive memory), magnetic tape, a removable computer diskette, a random access memory (RAM), a read-only memory (ROM), a rigid magnetic disk (e.g., a hard drive) and an optical disk. Current examples of optical disks include compact disk—read only memory (CD-ROM), compact disk—read/write (CD-R/W) and Digital Versatile Disk (DVD).

Figure 1:
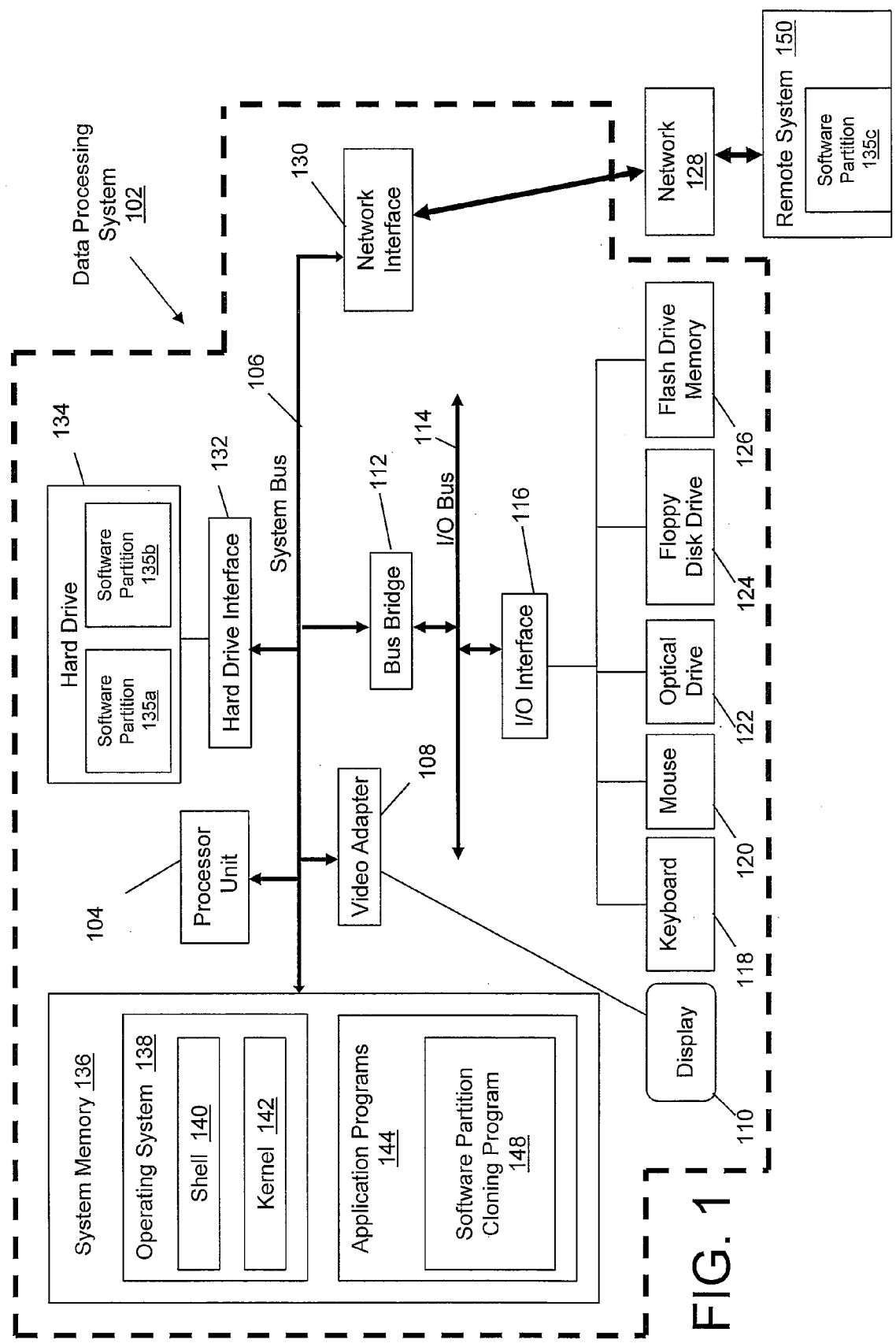
FIG. 1 is a block diagram that depicts an exemplary data processing system in which the present invention may implemented.

Referring now to the drawings, wherein like numbers denote like parts throughout the several views, FIG. 1 shows a block diagram of a data processing system suitable for storing and/or executing program code in accordance with one or more embodiments of the present invention. The hardware elements depicted in data processing system 102 are not intended to be exhaustive, but rather are representative to highlight essential components required by the present invention. Data processing system 102 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, an optical disk drive 122, a floppy disk drive 124, and a flash drive memory 126. The format of the ports connected to I/O interface 116 may be any known to those skilled in the art of computer architecture, including but not limited to Universal Serial Bus (USB) ports.

Data processing system 102 is able to communicate with a remote system 150 via a network 128 using a network interface 130, which is coupled to system bus 106. Network 128 may be an external network such as the Internet, or an internal network such as an Ethernet or a Virtual Private Network (VPN). Network interface 130 is a device or adapter that provides a Remote system 150 may utilize a similar architecture design as that described for data processing system 102.

A hard drive interface 132 is also coupled to system bus 106. Hard drive interface 132 interfaces with hard drive 134. In a preferred embodiment, hard drive 134 populates a system memory 136, which is also coupled to system bus 106. Data that populates system memory 136 includes an operating system (OS) 138 of data processing system 102 and application programs 144. Software partitions 135a-b are stored on hard drive 134. While two software partitions are shown, more than two software partitions may be stored on hard drive 134. It should also be noted that hard drive 134 is not a single device, but can be any form of mass storage suited to data processing system 102. Software partition 135c is similarly stored by remote system 150 and accessible to data processing system 102 via network 128.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management. Application programs 144 in system memory 136 include a software partition cloning program 148. Software partition cloning program 148 includes code for implementing the process described in FIG. 3.

The hardware elements depicted in data processing system 102 are not intended to be exhaustive, but rather are representative to highlight exemplary components suited for implementing the present invention. For instance, data processing system 102 may include alternate memory storage devices such as magnetic cassettes, Digital Versatile Disks (DVDs), Bernoulli cartridges and the like. These and other variations are intended to be within the spirit and scope of the present invention.

Figure 2:
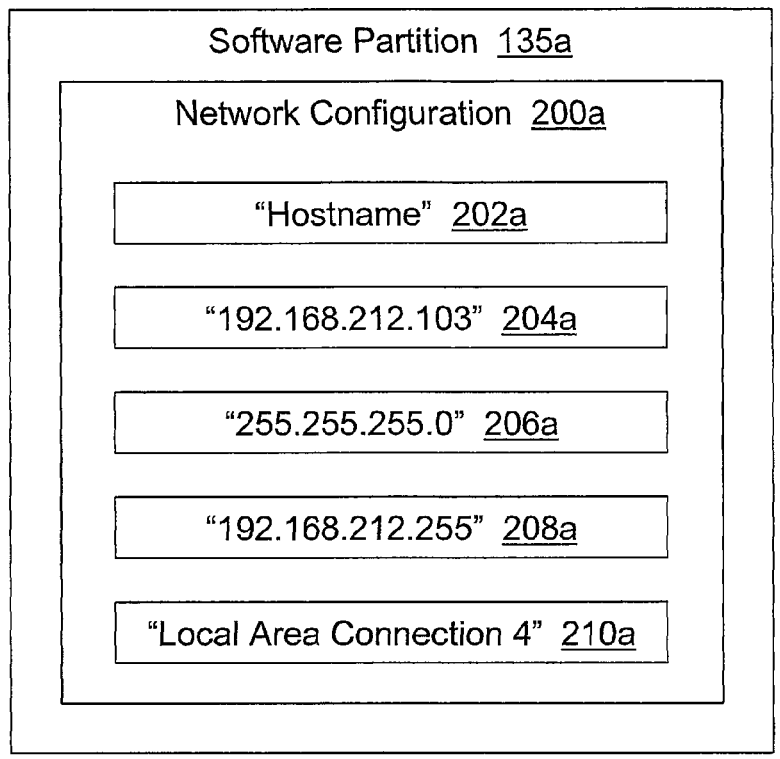
FIG. 2 is a block diagram that depicts two network configurations and the elements that comprise each network configuration.
Figure 2:
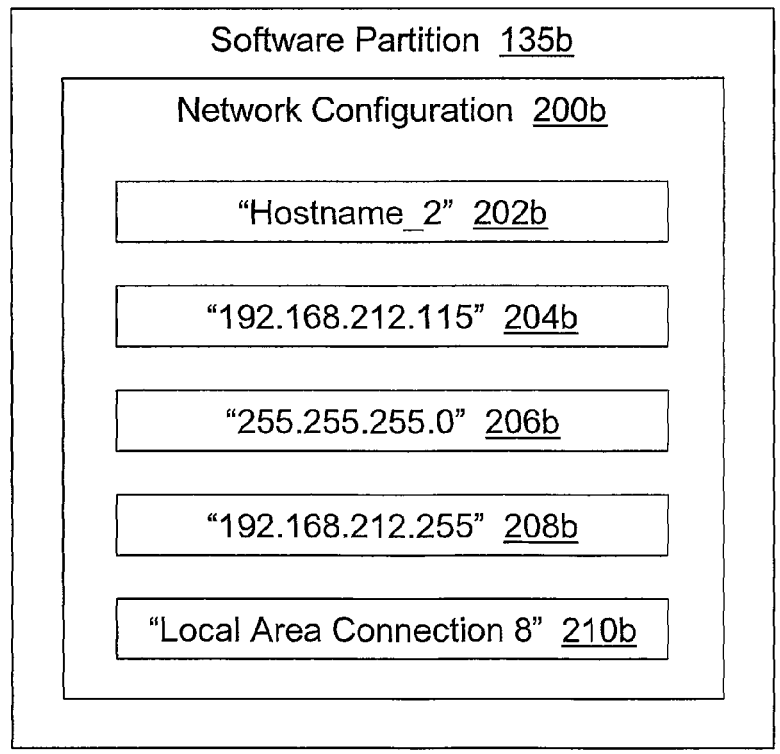

With reference now to FIG. 2, a block diagram is shown of a pair of network configurations 200a, 200b for a respective pair of software partitions 135a, 135b. The second software partition (135b) is cloned from first (original) software partition 135a by software partition cloning program 148. Second software partition 135b is therefore referred to herein as cloned software partition 135b. While only two network configurations 200a, 200b are shown, software partition 135 may include more than one network configuration 200. Network configurations 200a, 200b each include a respective hostname 202 a network address 204, a network mask 206, a broadcast address 208 and a network interface name 210.

Hostnames 202a, 202b are unique names by which each software partition 135 is identified on network 128, such as a domain name. There is one hostname 202a for software partition 135a, and one hostname 202b for software partition 200b. Each network configuration 200a of software partition 135a shares the same hostname 202a, and each network configuration 200b of software partition 135b shares the same hostname 200b. Network address 204a (204b) is a network layer address, such as an IP address. Network mask 206a (206b) is used in conjunction with network address 204a (204b) to define the subnet to which network configuration 200a (200b) belongs. Broadcast address 208a (208b) is a network address that allows data to be sent to all network addresses of a subnet, instead of one particular address. Network interface name 210a (210b) is the name of the network interface 130 used by network configuration 200a (200b) to access network 128. Examples of network interface name may include "Local Area Connection" or "Wireless Connection".

Two network configurations 200a, 200b on system 102 conflict with each other when they share the same network interface and have the same network address. This situation is common following the cloning of software partitions. The process of cloning software partitions involves taking configuration settings from an existing partition and reusing them to create a new "cloned" software partition. The new "cloned" partition will have the same network configuration(s) as the original software partition, giving rise to a conflict. With reference now to FIG. 3, a flowchart 300 is shown that depicts an enhanced software partition cloning program 148 that resolves conflicts between network configurations 200 that arise during cloning. Program 148 starts at initiator block 302. In step 304, the process determines whether an original network configuration of a cloned software partition conflicts with an existing software partition on the system. If the original network configuration does not conflict, the process ends at terminator block 330. If the original network configuration does conflict, program 148 uses the name of the new cloned partition as a prospective hostname (step 306) and determines whether the prospective hostname is in use by another software partition on the system (step 308).

If the prospective hostname is in use by another software partition on the system, program 148 attempts to find a valid hostname by looking for a network address in a different network configuration (step 310). If a network address is found in a different network configuration, program 148 performs a reverse lookup (e.g., query DNS server) on that network address to find the corresponding hostname and uses that hostname as the prospective hostname (step 314). If a network address is not found in a different network configuration, program 148 generates a prospective hostname by appending numbers to the hostname of the original network configuration (step 312). Program 148 returns to step 308 to determine whether the prospective hostname is in use by another software partition on the system. This process continues recursively until a unique prospective hostname is found for the network configuration. As shown by FIG. 2, cloned partition 135b has a different hostname 202b acquired by adding the number 2 to the hostname 202a of the original partition 135a. In another embodiment, the hostname for cloned partition 135b may be acquired via the reverse lookup process.

With a unique hostname assigned to the cloned partition, the program 148 performs a lookup on the potential hostname to generate a prospective network address (step 316) and verifies that the prospective network address matches an active network interface (step 318). In step 320, program 148 queries the software partition that is hosting the system to obtain the remaining information for the prospective network configuration (i.e., network mask, broadcast address and network interface name). Program 148 determines whether the prospective network configuration conflicts with another network configuration on the system (step 322). If there is no conflict, program 148 removes the original network configuration from the software partition (step 324), assigns the prospective network configuration to the software partition (step 326) and ends at terminator block 330. If a conflict with the network address still exists, program 148 returns to step 310 and attempts to find another network configuration that is not in conflict with any other software partition on the system. Cloned partition 135*b* (FIG. 2) is thus assigned a different network configuration (i.e., different/unique network address) from original partition 135*a*.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

The flowchart and diagrams in the Figures illustrate the architecture, functionality, and operation of possible implementations of systems, methods and computer program products according to various embodiments of the present invention. In this regard, each block in the flowchart or diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method for resolving network configuration conflicts for cloned software partitions in a data processing system comprising:
    cloning a first software partition of a data processing system to obtain a cloned software partition that includes a prospective network configuration and another network configuration;
    responsive to detecting a conflict between the prospective network configuration and a network configuration of another software partition:
        assigning a hostname to the prospective network configuration, including:
            detecting a network address for said another network configuration of the cloned software partition; and
            performing a reverse lookup on the network address for said another network configuration to retrieve a hostname corresponding to the detected network address, the retrieved hostname applied as a prospective hostname for the prospective network configuration of the cloned partition;
        performing a lookup on the retrieved hostname to generate a prospective network address for the prospective network configuration; and
        replacing a network address contained within the prospective network configuration with the generated network address.

2. The method of claim 1, wherein the prospective network configuration of the cloned software partition has a cloned hostname, said method further comprising replacing the cloned hostname with said prospective hostname within the prospective network configuration of the cloned software partition.

3. A non-transitory computer-readable storage medium encoded with a computer program for resolving network configuration conflicts for cloned software partitions, said computer program including computer-executable instructions that, when executed by a data processing system, perform a method comprising:
    cloning a first software partition of a data processing system to obtain a cloned software partition that includes a prospective network configuration and another network configuration;
    responsive to detecting a conflict between the prospective network configuration and a network configuration of another software partition:
        assigning a hostname to the prospective network configuration, including:
            detecting a network address for said another network configuration of the cloned software partition; and
            performing a reverse lookup on the network address for said another network configuration to retrieve a hostname corresponding to the detected network address, the retrieved hostname applied as a prospective hostname for the prospective network configuration of the cloned partition;

performing a lookup on the retrieved hostname to generate a prospective network address for the prospective network configuration; and replacing a network address contained within the prospective network configuration with the generated network address.

4. The non-transitory computer-readable storage medium of claim 3, wherein the prospective network configuration of the cloned software partition has a cloned hostname, said method further comprising replacing the cloned hostname with said prospective hostname within the prospective network configuration of the cloned software partition.

* * * * *